US012809850B2

(12) United States Patent
Shandilya et al.

(10) Patent No.: US 12,809,850 B2
(45) Date of Patent: Nov. 24, 2026

(54) CONFIGURABLE VALIDATION SYSTEM FRAMEWORK AND TOOL FOR DATA MIGRATION

(71) Applicant: CERNER INNOVATION, INC., Kansas City, MO (US)

(72) Inventors: Sumeet V. Shandilya, Nashik (IN); Sarthak Sengupta, Dhanbad (IN); Abhishek Kumar, Biharigani (IN); Narasimha Prasad Aswatha-Narayana, Bengaluru (IN)

(73) Assignee: CERNER INNOVATION, INC., Kansas City, MO (US)

( * ) Notice: Subject to any disclaimer, the term of this patent is extended or adjusted under 35 U.S.C. 154(b) by 0 days.

(21) Appl. No.: 18/884,173

(22) Filed: Sep. 13, 2024

(65) Prior Publication Data

US 2025/0278396 A1 Sep. 4, 2025

Related U.S. Application Data

(60) Provisional application No. 63/559,326, filed on Feb. 29, 2024.

(51) Int. Cl.

*G06F 16/00* (2019.01)
*G06F 16/21* (2019.01)
*G06F 16/23* (2019.01)
*G06F 16/25* (2019.01)

(52) U.S. Cl.

CPC ........ *G06F 16/2365* (2019.01); *G06F 16/214* (2019.01); *G06F 16/258* (2019.01)

(58) Field of Classification Search

None

See application file for complete search history.

(56) References Cited

U.S. PATENT DOCUMENTS

| | | | | |
|---|---|---|---|---|
| 8,725,701 | B2 | 5/2014 | Parkes et al. | |
| 10,963,435 | B1 * | 3/2021 | McAlister | G06F 11/0766 |
| 2017/0293667 | A1 * | 10/2017 | Denner | G06F 16/254 |
| 2019/0205429 | A1 * | 7/2019 | Lee | G06F 16/214 |
| 2019/0310973 | A1 * | 10/2019 | Singh | G06F 16/2365 |
| 2019/0332697 | A1 * | 10/2019 | Williams | G06F 16/2365 |
| 2022/0261395 | A1 * | 8/2022 | Gubba | G06F 16/258 |
| 2023/0083221 | A1 | 3/2023 | Lara et al. | |
| 2024/0061857 | A1 * | 2/2024 | Green | G06F 16/258 |
| 2024/0119031 | A1 * | 4/2024 | Lahiri | G06F 16/211 |
| 2024/0126718 | A1 * | 4/2024 | Chakravarthy | G06F 16/119 |
| 2024/0297876 | A1 * | 9/2024 | Swaminathan | H04L 63/083 |
| 2025/0124009 | A1 * | 4/2025 | Bhar | G06F 16/214 |

* cited by examiner

*Primary Examiner* — Farhan M Syed

(74) *Attorney, Agent, or Firm* — Kraguljac Law Group LLC

(57) ABSTRACT

Systems, methods, and other embodiments are described that are associated with a configurable validation system and framework that may be used for data exchange or migration. The system provides a specification neutral design for validating a source dataset. The configurable validation system is configured to receive a specification configuration associated with a selected source dataset, wherein the specification configuration provides at least scanning parameters and formatting rules that are input to configure the configurable validation system to validate the selected source dataset. The configurable validation system is reconfigurable to scan and validate a different source dataset in response to receiving a different specification configuration without reprogramming the configurable validation system.

19 Claims, 6 Drawing Sheets

CONFIGURABLE VALIDATION SYSTEM FRAMEWORK AND TOOL FOR DATA MIGRATION

CROSS REFERENCE TO RELATED APPLICATION

This disclosure claims the benefit of priority to U.S. Provisional Patent Application No. 63/559,326 entitled "Validation Framework and Tool for Data Migration," filed Feb. 29, 2024, assigned to the present assignee, which is incorporated herein by reference in its entirety for all purposes.

BACKGROUND

Computer systems of businesses and corporations generate and exchange data regularly. Each data exchange necessitates mutual agreement between the parties involved such as a data producer that controls a source system and a data consumer that controls a destination/target system, which will receive the exchanged data. The agreement includes information on data exchange format and other exchange requirements that are specific to the data being exchanged. These are steps taken to ensure that the data is correct and can be exchanged/migrated with the most amount of valid usable data and the least amount of errors and/or the least amount of invalid data.

The complexity of these checks increases multifold as data volumes expand exponentially. In scenarios involving high-volume data exchange, whether between vendors, from source to target destination within the same or different companies, it becomes imperative to validate the integrity of both the files and the data the files contain. Many prior exchange systems relied on manual validation steps where technical personnel would randomly pick a data record and view it for validation. With large data sources, only about 10% of the data could be validated, which created potential technical problems with the data since many undiscovered errors may exist in the data source.

This prior validation process was not efficient or reliable and certainly not complete. This prior validation process was not efficient in adapting to changes, whether between different consumers and/or data versions of data. Since the validation relied on a technician's expertise from a group of validating technicians, the process was not realistically scalable.

SUMMARY

In one embodiment, a computing system is described that includes a configurable validation system for validating data of a source dataset that may be exchanged or migrated to a destination. The system may include at least one processor operably connected to at least one memory and a non-transitory computer readable medium. A configurable validation system including instructions stored in the non-transitory computer readable medium that are executable by the at least one processor, wherein the configurable validation system is configured to scan a source dataset and validate the source dataset;

wherein the configurable validation system is configured with scanning variables and validation variables. A graphical user interface configured to display options for selecting a source dataset for validation and for selecting a specification configuration associated with the source dataset; wherein the configurable validation system is configured to receive the specification configuration associated with the selected source dataset, wherein the specification configuration provides at least scanning parameters and formatting rules that are input to the scanning variables and the validation variables to configure the configurable validation system to validate the selected source dataset; and wherein the configurable validation system is reconfigurable to scan and validate a different dataset in response to receiving a different specification configuration without reprogramming the configurable validation system.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that implement a framework and tool for providing a configurable scanning and validation system that is dynamically configurable for a particular source dataset. The scanning and validation system is configured as a specification neutral system but adapts to a particular source dataset based on a specification configuration that is designed for the particular source dataset.

The specification configuration, which is input to the configurable validation system, configures and controls the validation system logic/algorithms to scan, interpret, and/or validate data from the source dataset in a designated manner prior to migrating or exchanging the data to a destination location or system. By changing the specification configuration for a new different source dataset, the same validation system logic/algorithms may be used to scan and validate the new source dataset without reprogramming the validation system or programming new logic for the new source dataset.

In one embodiment, the configurable validation system provides a solution that facilitates the creation of dynamic analytics logic, allowing flexibility in adopting new configurable specifications at any point in time without altering the existing analytics logic of the configurable validation system. The validation system may generate valuable, actionable insights for a user relating to what the analytics logic found after scanning the source dataset. This may include identifying which data is valid and which data is invalid based on the specifications of the source dataset, for example, Data migration goes through multiple steps including data extractions, specification compliance, quality assurance (QA), importation, etc. Major issues usually arise due to the data not complying with the specifications as that is one piece that links the data source to the data target. Unless the source data is clean and valid, the source data becomes very difficult to migrate.

The present validation system is configured to scan a source dataset based on a configurable specifications to determine that the source dataset includes the correct files and/or data that are expected to exist and that the files and/or data are in an expected format. The specifications of the source dataset define the expected structures of files and data formats that the validation system uses when scanning and validating the source dataset. This provides an automated mechanism to ensure the source dataset is clean and ready for exchange/migration and also identifies any corrupt data that may exist.

Figure 1:
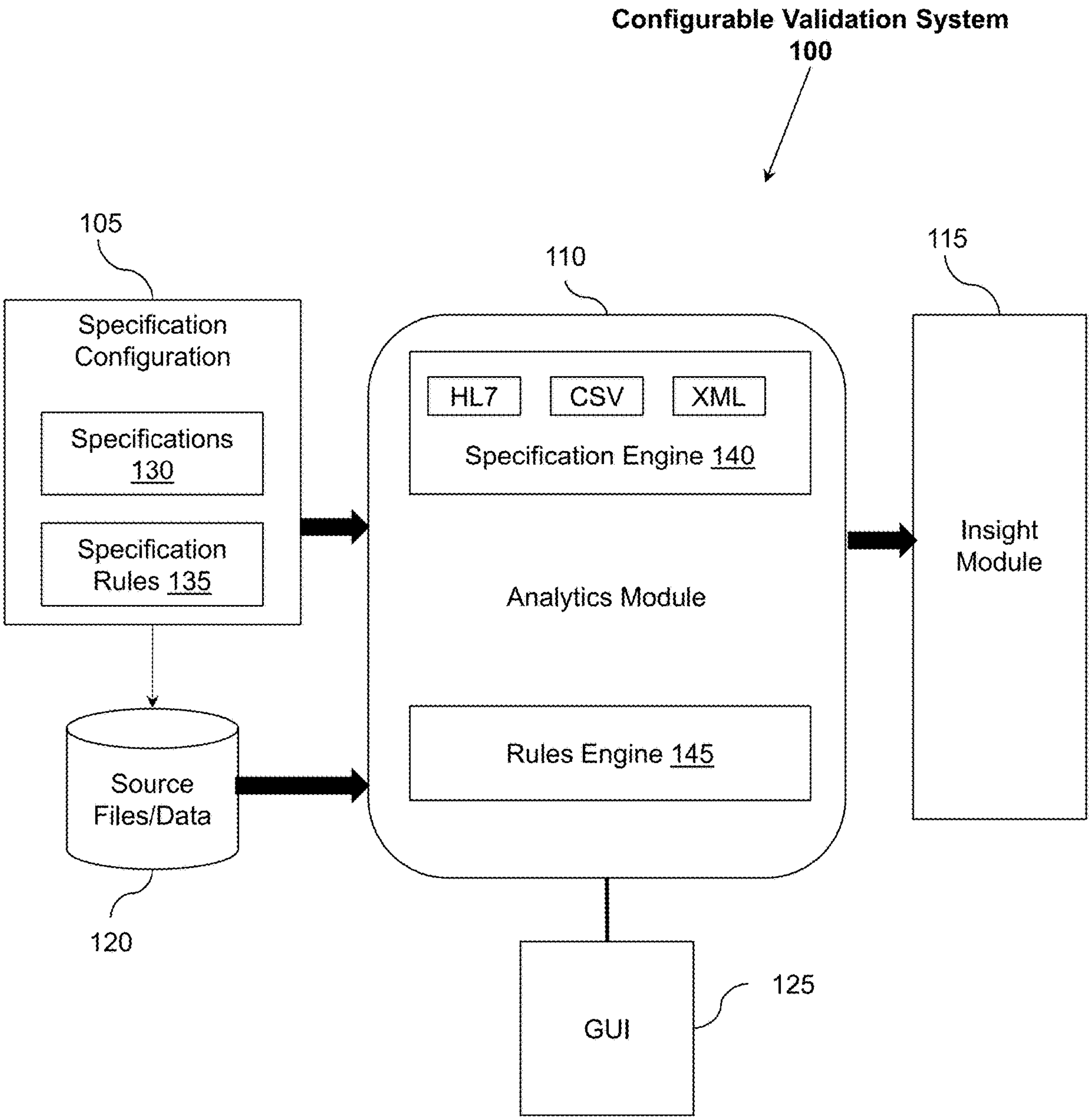
FIG. 1 illustrates one embodiment of a configurable validation system for validating data from a source dataset.

With reference to FIG. 1, one embodiment of a configurable validation system 100 associated with scanning and validating data in a dynamically configurable manner is illustrated.

In one embodiment, the configurable validation system 100 may include one or more components, for example, a specification configuration 105, an analytics module 110, and an insights report module 115 (e.g., a reporting module).

The Specification Configuration 105 is a configurable file or module that is configured with and holds file rules that define expected file structures in a source dataset 120. The specification configuration 105 is input to the configurable validation system and provides parameters or rules for logic within the analytics module 110 to scan and validate files within the source dataset 120 to identify and classify what files are valid, what files are invalid, and what files are unclassified (e.g., system cannot determine as valid or invalid).

The specification configuration 105 may also be configured with and contain formatting rules that define expected data formatting and grammar that is permitted for the data records and/or data values found in the source dataset 120. The formatting rules may be used to provide parameters or rules for the logic within the analytics module 115 to scan and validate data records and data values within the source dataset 120 in a defined manner to classify what data is valid, what data is invalid, and what data is unclassified.

In one embodiment, the expected file structures and formatting may define expected file formats that are valid, data record formats that are valid or invalid, data field formats that are valid or invalid, data values for specific data fields that are valid or invalid, and/or other formatting rules for the specific source dataset 120. Using the specification configuration is dynamic and each data vendor, project, or use case may have their own "Specification Configuration" defined for each different source dataset. Thus, a new specification configuration 105 may be generated for a new source dataset for use by the configurable validation system 100 without reprogramming the logic/algorithms of the analytics module 110 to perform a specific type of scanning and validation for the specific source dataset.

The specification configuration 105 defines format rules for valid file formats and data formats in the source dataset. These rules are used by the configurable validation system 100 to scan and check if the data records and fields found in the source dataset 120 follow these rules to ensure they are valid. For example, the specification configuration may (i) define format rules that data fields in the selected source dataset are expected to comply with and (ii) define one or more compliance rules that identify valid data values that are permitted to be found in the data fields of the selected source dataset. The format rules may include expected grammar and data formatting rules associated with the data records and the data fields of the selected source dataset.

In one embodiment, the specification configuration 105 may include separate modules, for example, a specifications module 130 that defines the formatting of the data as a whole, and a specification rules module 135 that defines grammar and/or other data formatting rules for the data of the associated source dataset 120.

The specifications module 130 may be configured with customizable instructions that define at least a formatting of the source dataset 120 as a whole. For example, the customizable instructions may define or specify expected/valid file structures of files, valid file types, expected data structures of data, etc.

The specification rules module 135 may be configured with customizable rules that define validation rules to be applied to the data records and data fields in the source dataset 120. The validation system 100 uses and compares the validation rules to corresponding files/data in the source dataset 120 to determine if the files/data satisfy the rules.

In another embodiment, the validation system 100 may include a plurality of different specification configurations 105, where each includes different specification modules 130 and specification rules modules 135. The specification modules 130 and the specification rules modules 135 may be assigned together as configuration pairs for scanning and validating a particular source dataset.

For example, the specifications module 130 may be configured with customizable instructions that define at least a formatting of a source dataset that includes at least file structures of files and data structures of data. The specification rules module 135 may be configured with customizable instructions that define at least data format rules for data records and data fields in the source dataset that the data records and data fields are to comply with to be valid.

These different specification configurations 105 may be defined and stored in a central database and then made available for use later (or used multiple times) for validating similar source datasets in the future or revalidating the same source dataset that has been updated or modified. The analysis module 110 is configured to receive as input a selected configuration pair (a specification module and a specification rules module) for scanning and validating a particular source dataset. This makes the validation system adaptable and dynamically configurable for different source datasets.

In one embodiment, the validation rules may contain conditions for data to valid and/or invalid, permitted data values for specified data fields, data format rules, etc., that the data records and data fields are expected to comply with to be valid. In one embodiment, the specifications module 130 and the specification rules module 135 may be configured in a JSON format that is readable by the analytics module 110.

In one embodiment, the configurable validation system 100 includes instructions stored in a non-transitory computer readable medium that are executable by at least one processor of a computing system. The configurable validation system 100 may be configured to scan a selected source dataset (e.g., source dataset 120) and validate the source dataset in accordance with the specification configuration 105 that is associated with the selected source dataset.

For example, the configurable validation system 100 may be configured with scanning variables and validation variables as part of its logic/algorithms in the analytics module 110. The configurable validation system 100 may be configured to retrieve and input the specification configuration 105 associated with the selected source dataset 120, where the specification configuration 105 provides at least scanning parameters and formatting rules that are input to the variables in the logic of the configurable validation system 100. These inputs configure the logic to validate the selected source dataset according to the rules and definitions provided in the specification configuration 105.

The configurable validation system 100 may also be programmed to compare scanned files and data against applicable rules contained in the specification configuration to validate the files and data to determine if the files and data are in an expected form (e.g., based on formatting rules, grammar rules, valid data rules, etc.).

In this manner, the configurable validation system 100 is dynamically reconfigurable to scan and validate a different source dataset in response to receiving a different specification configuration without having to reprogram the configurable validation system 100. This is an improvement over prior systems that were specifically programmed to scan and validate a specific dataset. These prior systems had to be reprogrammed any time the dataset changed, or a new validation rule was added or changed, which were technical problems with these systems. Some prior systems had to have their code rewritten from scratch for every different dataset that was validated.

In one embodiment, a graphical user interface GUI 125 may be provided that is configured to display options for selecting a source dataset for validation and for selecting a specification configuration associated with the source dataset. There may be multiple different source datasets available for validation and each source dataset may have an associated specification configuration that has been created for the specific source dataset. The GUI 125 may also be configured to provide options for creating, customizing, or revising a specification configuration to create different rules for scanning and validating different source datasets.

In one embodiment, the analytics module 110 may be configured with an algorithm/logic for scanning a selected source dataset in accordance with an identified specification configuration that is associated with the selected source dataset. For example, the analytics module 110 may include a Specification Engine 140 configured to accept as input the specifications 130. The specification engine 140 includes executable logic to scan and check input files from the source dataset 120 for format compliance based on the defined formats from the specifications 130. The specification engine 140 may be based on one or more different data file types, for example, HL7, CSV, XML, or other data file format.

The analytics module 110 may be configured with a Rules Engine 145 configured to accept as input the specification rules 135. The rules engine 145 is configured with executable logic that scans and checks for grammar compliance, format compliance, data value compliance, and/or other data validation compliance using the format/validation rules defined in the specification rules 135. The specification engine 145 applies the format/validation rules to the scanned data within the source dataset 120 to identify valid data, invalid data, and/or potentially invalid data (e.g., a warning message).

Thus, the analytics module 110 may be a static module that is data format agnostic. The analytics module 110 is programmed to adapt to the specification configurations 105 that are input for a particular source dataset. In this manner, the analytics module 110 dynamically changes how data is scanned and validated. Logic within the analytics module 110 uses the specification configurations 105 identified for a particular source dataset to analyze the files and data from the source dataset to determine what data is valid and what data is not valid (e.g., data that does or does not comply with the specification configuration). By changing the specification configuration 105, the analytics module 110 can scan and validate a different source dataset using different validation rules. As such, the validation system 100 is dynamically configurable for different source datasets.

In one embodiment, scanning and validation results from the analytics module 115 may be provided to the insights module 115 that is configured to generate an insights report. Based on the scan, the insights report may be generated to identify, for example, corrupt files and corrupt data records that were identified (e.g., identified invalid files and/or invalid data). The insights report may also be generated with actionable items to be performed to correct the corrupt files and the corrupt data records prior to migrating the selected source dataset to the destination system. Corrective actions may be generated, for example, based on the type of validation rule that the corrupt file or data did not comply with. In general, the insights report module 115 is configured to generate user actionable reports and summaries from the scanning results in accordance with the specification configurations 105 and the source dataset 120 that was validated.

In one embodiment, each component of the configurable validation system 100 may be plugged into one another or may be configured and executed as separate components used as stand-alone modules.

Figure 2:
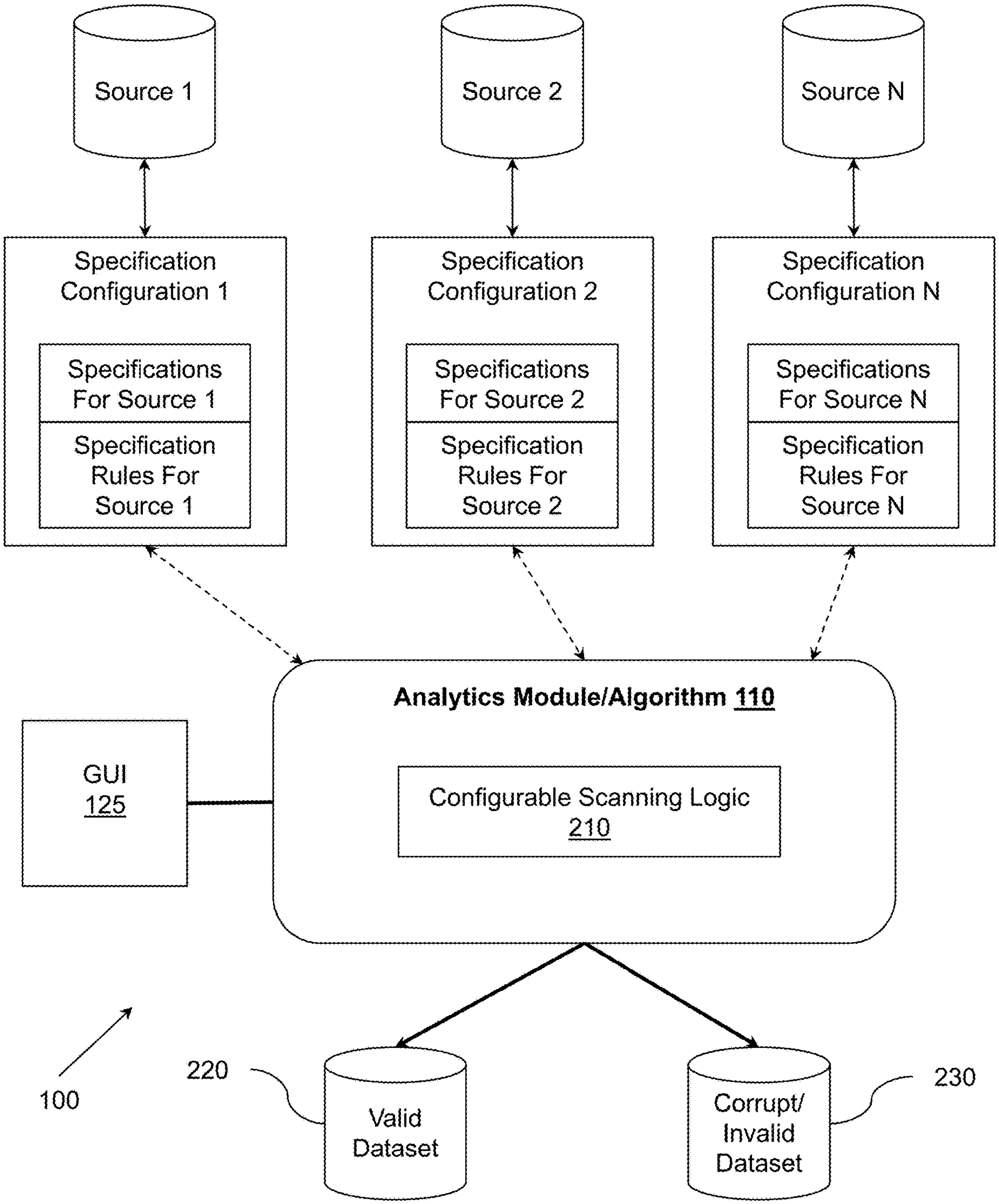
FIG. 2 illustrates another embodiment of a configurable validation system that is adaptable to different specification configurations.

With reference to FIG. 2, another embodiment of the configurable validation system 100 is illustrated that is associated with selecting and scanning different source datasets without reprogramming its logic.

With the graphical user interface (GUI) 125, the configurable validation system 100 allows a user to select a source dataset that is to be validated. For example, a number of source datasets may be available and previously identified in the system (e.g., source dataset 1, source dataset 2, source dataset N). Each source dataset is different and may contain different file structures, different data records, different data formats, and different data values.

Each source dataset may include an associated specification configuration that has been generated for the particular source dataset based on the types of files and data it contains. For example, specification configuration 1 is associated with and assigned to source dataset 1. Specification configuration 2 is associated with and assigned to source dataset 2. Specification configuration N is associated with and assigned to source dataset N.

Based on the selected source dataset, the configurable validation system 100 retrieves and inputs the associated specification configuration. The GUI 125 may also provide an option to identify and select the associated specification configuration, which is used to retrieve the specification configuration from a storage location. The specification configuration provides instructions about file structures, file formats and data format rules that describe how the source dataset is structured and how its data is formatted. This is how the configurable validation system 100 determines how to scan and validate the source dataset when specification configuration is input to the configurable scanning logic 210 of the analytics module 110.

For example, the configurable scanning logic 210 may include programmable scanning parameters and validation rules that are dynamically configured by the instructions received from the specification configuration. In this manner, the configurable validation system 100 may scan and validate the selected source dataset according to the instructions from the specification configuration.

In one embodiment, as the validation process executes (or upon completion), the analytics module 110 may generate a valid dataset 220 in a database that includes valid files and valid data records from the selected source dataset that were found to comply with the specification configuration. The valid files and valid data records are stored into the valid dataset 220.

A corrupt/invalid dataset 230 may also be generated that includes invalid files and invalid data records from the selected source dataset that did not comply with the specification configuration. The invalid files and/or invalid data records are stored in the corrupt/invalid dataset 230 thereby separating the valid files/data from the invalid files/data that were found during validation.

This allows the system to use and migrate the valid portion of the source dataset (e.g., the valid dataset 220) without having to wait until corrective actions are taken to fix the source dataset. For example, this may be beneficial in time sensitive situations to allow the valid dataset 220 to be migrated to a destination system and be available for access without additional delay.

Some prior validation systems required the invalid data to be corrected before any of the source dataset could be migrated. This caused technical problems and delays in the migration process even when a small percentage of the data was found to be invalid. The present system provides a technical improvement by generating the valid dataset 220, which may then be used in a live system without delay.

In this manner, the configurable validation system 100 is easily adaptable and dynamically configurable to scan and validate a different source dataset simply by inputting an associated specification configuration that defines file rules and/or data format rules. Thus, by using the GUI 125, a first source dataset may be selected by a user (e.g., source 1) and validated by the validation system 100 based on its associated specification configuration. The user may then select a second source dataset (e.g., source 2) and the validation system 100 will validate the second source dataset based on its associated specification configuration without reprogramming the configurable validation system 100.

The present system improves previous validations systems that had to be specifically programmed to validate a specific source dataset. If anything changed with the source dataset such as different file types or revised data values that are deemed valid, the previous systems had to be reprogrammed. Other prior systems further required manual validation of data records, which were very restricted in the amount of data that could be validated when the datasets are large. For example, in large datasets, only about 10% of the actual data was validated. The present system improves upon those systems by being able to scan large volumes of data systematically regardless of the volume.

Figure 3:
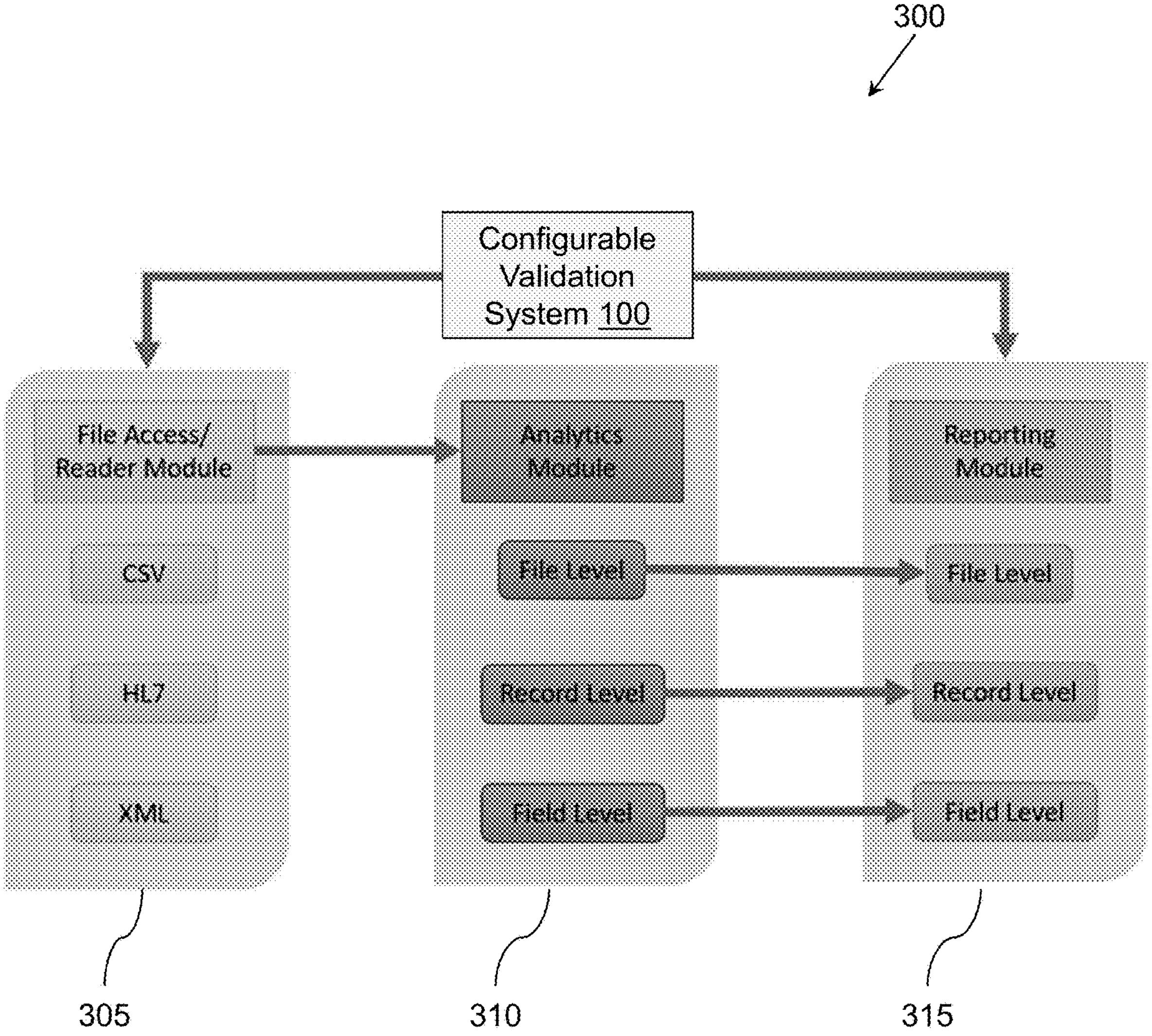
FIG. 3 illustrates another embodiment of the configurable validation system with multiple levels of scanning and reporting.

With reference to FIG. 3, another embodiment of the configurable validation system 100 is illustrated as validation system 300. The validation system 300 may be configured as a multi-level validation system and include one or more modules, for example, file access module 305, analytics module 310, and reporting module 315.

File Access Module 305 may be configured to read system folders and directories for files with described file extension (s) specified by the specification configuration 105. For example, the source dataset may have different file types such as CSV, HL7, or XML. The specification configuration 105 may specify rules for particular files to be in a particular format, for example, XML format. If the files are scanned and found to be in a different format (e.g., has a different file extension than expected or required by the specification configuration), then the file is flagged as invalid/error. The file access module 305 may also gather basic data, for example, a total number of files found in the source dataset, filenames, etc. for use by the analytics module 310.

Analytics Module 310 may be configured to scan the data in the source files at multiple levels to validate compliance of source dataset based on a selected specification configuration (e.g., specifications module and specification rules module). The multiple levels may include, but are not limited to, a file level scan, a record level scan, and a field level scan. The analytics module is configured to scan the source dataset based on input definitions from the specification module and the specification rules module.

As previously described, the specification configuration is dynamic and can be changed based on different source datasets. Different parties involved in a data exchange or migrations may have different requirements for validation and different formats of the data to be exchanged/migrated. The specification configuration file may be created (e.g., JSON file) each time a new source data is to be exchanged. The specification configuration file may be defined with details about each field in the data being exchanged and their details, any compliance rules that the data must meet, or other parameters for the exchange/migration.

For example, a source dataset may contain a data records with a Date of Birth data field. This date field may be designated as a required filed and must have a format of date and time as YYYYMMDD and a time. This may be defined by a formatting rule.

Name Fields may have specified requirements. For example, from a source dataset that is health related, a rule may allow a patient name field to have a current name and a previous name (pre-marriage name). Rules for a data field for a first name may allow the name to be repeated and state that the last name can have two (2) components. Other formatting rules may state that a name could have a title, identify any special characters allowed (e.g., hyphen allowed or not), specify any length limitations (e.g., 40 characters max) and specify that no special characters are permitted. A formatting rule may state that Name fields may be allowed to have sub-fields or components such as a middle name, as still comply with the formatting rules (e.g., still be valid).

These are examples of format parameters/rules that may be defined in the specification configuration based on the source data to designate what the data fields and formatting are expected to look like and what is considered valid or invalid data. These rules are used by the configurable validation system to scan and validate the source data prior to exchange or migration.

As another example, a phone number field in the source dataset may have one number or multiple numbers and may be restricted to a certain format. A format rule may be created for this in the specification configuration. Some data fields may be specified as expected but not required. Thus, if the data field is not found, it is not classified as invalid.

In another example, the source dataset may include a table that should have, for example, three (3) columns of data. If three columns are not found, then the table is classified as an error or corrupt. These parameters/rules are defined in the specification configuration to designate what the data fields and formatting are expected to look like and what is considered valid or invalid data.

In another embodiment, three levels of scanning and analytics may be performed: file level, record level, and data field level. These may be defined by different formatting and validation rules.

The File level scan may involve scanning files for proper file extension(s), sanity checks, corrupt file check. The file level scan may be based on at least file extensions to identify valid files and identify corrupt files based on whether the files comply with expected file extensions as defined by file rules in the specification module.

The Record Level scan may involve scanning data records in the files and classifying records as a Valid record, a Warning record (e.g., not valid but not invalid), or an Error record (e.g., invalid record) based on expected data records as defined in the specification rules for the selected source dataset. Thus, the record level scan scans and classifies data records in each file into record classifications including valid, warning, and error based on the data record complying with the specification configuration rules.

The Field Level scan may involve scanning each data field in a data record and validating the data field against the specification rules defined for the data fields of the selected source dataset. For example, each data field may be classified as Valid, Warning, or Error. Thus, the field level scan is configured to scan and classify each data field in the data records for validating each data field into field classifications including valid, warning, or error based on the data field complying with the data field rules defined in the specification rules module.

Reporting Module 315 may be configured to generate and output the analyzed data in human readable and/or actionable form. The output (e.g., insights report) is based on the results from the scanning and validation from the analytics module. In one embodiment, each scan level may be reported as a separate report.

In one embodiment, the reporting module 315 is configured to generate the insights report to include: a file level summary based on the file level scan; a record level summary based on the record level scan; and a field level summary based on the field level scan. The insights report may be generated to include actionable items to be performed for corrupt data prior to migrating the source dataset to the destination system.

One or more of the above modules may be configured to function based on the specification configuration file/module that is customizable on a case-to-case basis. The specification configuration functions as a backbone of the configurable validation system 100 as that will determine the accuracy of the source dataset and how consumable is the data from the source dataset.

Figure 4:
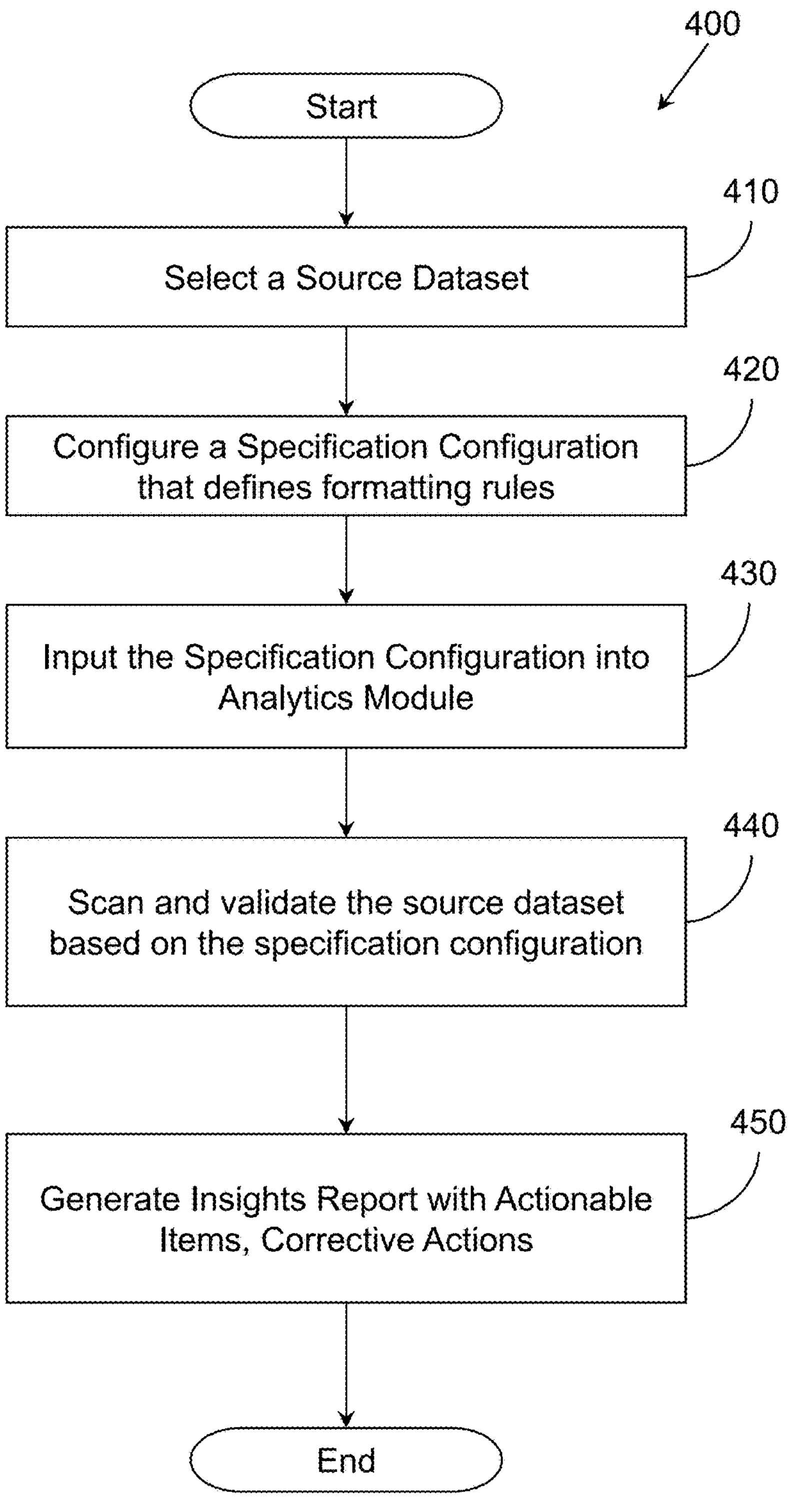
FIG. 4 illustrates one embodiment of a method associated with validating a source dataset with the configurable validation system using a customizable specification configuration.

With reference to FIG. 4, one embodiment of method 400 is illustrated that is associated with scanning and validating a source dataset using the configurable validation system 100. For example, method 400 may be associated with validating a source dataset prior to exchanging or migrating data from the source dataset to another destination. Method 400 may be performed by the configurable validation system 100 in one embodiment and will be described with reference thereto.

At block 410, the GUI 125 of the configurable validation system 100 may be displayed on a computing device. The GUI 125 is configured with and displays options to select a source dataset that is identified for validation prior to, for example, migrating the source dataset to a destination system. The GUI 125 may provide an input field to identify the source dataset and/or may provide a list of available source datasets, which may be selected by a user. Upon the user inputting or selecting the source dataset via the GUI 125, method 400 moves to block 420.

At block 420, the GUI 125 may provide options to select a specification configuration that is associated with the selected source dataset. If a specification configuration does not exist, the GUI 125 may display a second screen that provides input options to generate and configure the specification configuration for the selected source dataset. As previously described, the specification configuration defines various properties and rules for the selected source dataset.

The GUI 125 may provide input fields to designate, for example, file structures, file formats, grammar rules, valid data values for fields, etc., for the selected source dataset. The input fields may also define format rules for specific data records and data fields in the source dataset that the data records and data fields are to comply with to be valid. Once the specification configuration is completed, it is used by the configurable validation system 100 to scan and validate the source dataset.

At block 430, when the selected source dataset is ready to be validated, the validation system 100 is executed. The configurable validation system 100 may retrieve the specification configuration that is associated with the selected source dataset. The specification configuration, for example, may also be selected from a list of available specifications via the GUI 125 and retrieved from a database via network communication. Once retrieved, the specification configuration is input to the configurable validation system 100 to provide scanning parameters and formatting rules used by the analytics module 110 to scan and validate the source dataset.

At block 440, the analytics module 110 scans and validates the selected source dataset based on the specification configuration. The scanning process identifies valid files and valid data that comply with the specification configuration and identifies corrupt files and corrupt data that do not comply with the specification configuration. For example, the analytics module 110 parses identified files and/or data records and compares them to the format rules and other defined properties from the specification configuration. Examples are provided below. The corrupt files and/or invalid data fields may be flagged as invalid in one or more ways, for example, with an error tag or warning message.

As one example, suppose the validation system 100 is validating a source dataset that contains healthcare data and/or patient data. The specification configuration for the healthcare data may include format requirements and/rules for various data fields contained in the source dataset, for example, but not limited to, a "Patient Age" field, a "Deceased Indicator" field and a "Deceased Date Time" field. The specification configuration may define the "Patient Age" field as a numeric value representing years and must be greater than "0" and less than "120." Thus, if a negative value is found, the data field is invalid.

The specification configuration may define the "Deceased Indicator" field as a "Yes/No" field (e.g., permitted valid values are Yes or No) and that the field is “Required” meaning a value must be present. A “Deceased Date Time” field may be defined as a “Timestamp” type field meaning the date/time field should have a timestamp format of “YYYY-MM-DD” if a date/time is present, otherwise the field is invalid. The specification rules may further specify whether a data field is Required, Optional, or Conditional. For Required fields, the field must have a value present as specified. Optional fields are permitted to have a missing value. Conditional fields are defined with conditional rules that state what values or ranges are valid or not valid based on some condition or other data value.

For example, the “Deceased Indicator” field may be marked as a “Conditional” field in the specification configuration because it must be set to “Yes” if the “Deceased Date Time” field is populated. The rules may further state that a a “Warning” message is generated during validation if the “Deceased Indicator” is blank while the “Deceased Date Time” is populated.

In general, the specifications and rules can be configured in various combinations and complexities, adapting to specific cases and specific requirements of a particular dataset. This adaptability is a distinctive feature of the present system and its solution.

When inputting patient data into the validation system 100, the validation system 100 scans and compares the appropriate data fields with the corresponding rules from the specification configuration. Using the example above, if the “Deceased Indicator” field is found in a data record and its data value is blank, the data field would be marked as invalid since the corresponding rule states that the data field is “Required.” Other types of validating rules and data formats may also be applied during scanning as defined in the specification configuration.

In one embodiment, the analysis module 110 may be configured to identify how many files and/or data records from the source dataset complied with the specification configuration and how many files and/or data records did not comply with the specification configuration. A more detailed report may include identification of each file and data record from the selected source dataset that did not comply with the validating rules or formatting rules.

At block 450, an insights report may be generated using the results from the validation process, which may identify which files and data records were found to be invalid, corrupt, and/or had warnings. For example, the report may be generated that indicates “Failed” data fields or records that did not satisfy the corresponding validation format or rule. For Optional fields, they may be marked as “Pass,” and for Conditional fields, they may be marked as “Warning.”

The analysis module 110 may also generate recommended actionable items to be performed prior to migrating the source dataset to a destination system. The actionable items may include corrective actions that are recommended to correct particular files or data records/fields based on which formatting/validation rules were violated from the specification configuration.

Overall, using a customizable specification configuration for a source dataset, the validation system 100 is adaptable to different types of datasets to provide a systematic validation process that is configurable. As one advantage, the present validation system 100 imposes no limitations on the volume of data fed to it for scanning and validation, which could not be performed by prior techniques that relied on human validation.

Figure 5:
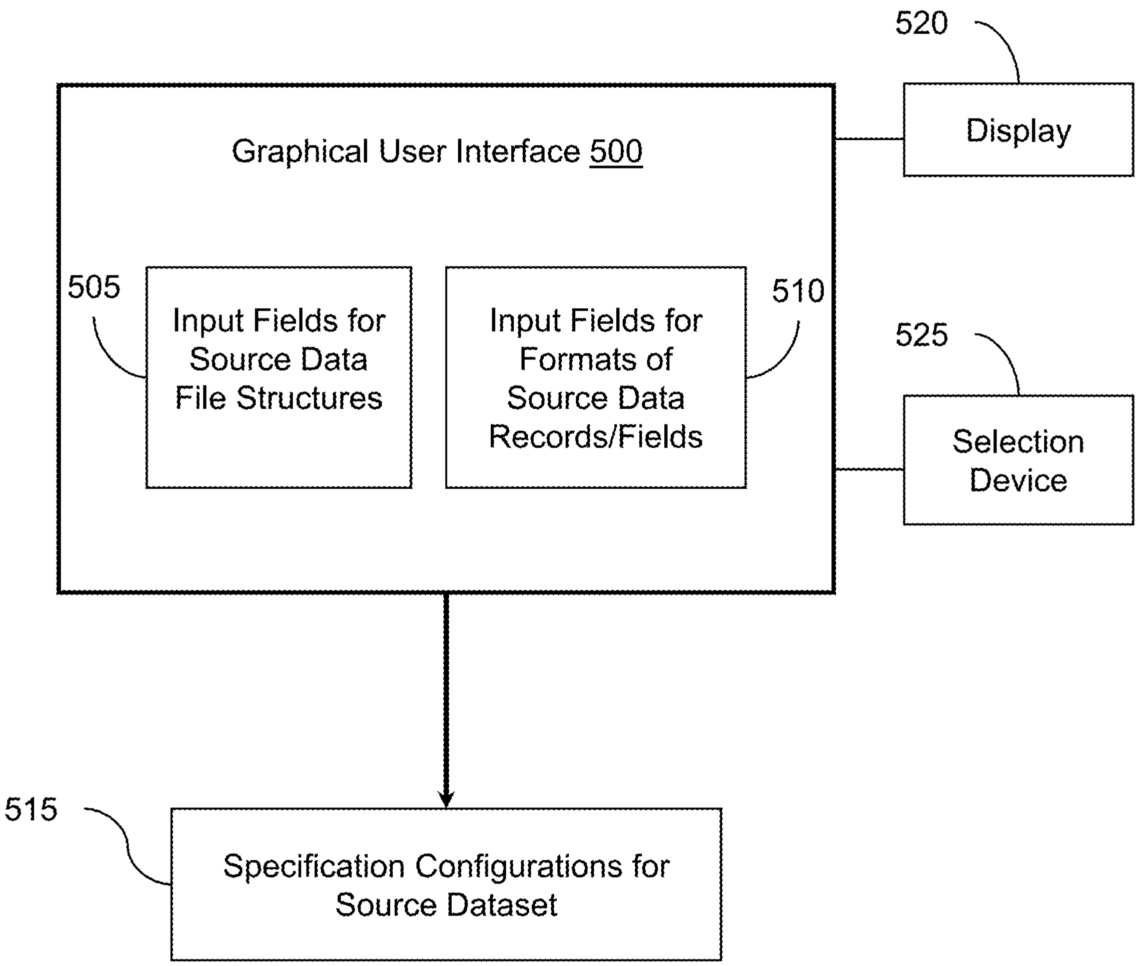
FIG. 5 illustrates an embodiment of a graphical user interface for defining a specification configuration for a source dataset.

With reference to FIG. 5, one embodiment of a graphical user interface (GUI) 500 is illustrated that is associated with generating or configuring a specification configuration for a particular source dataset. GUI 500 may be used for the previously described GUI 125 shown in FIGS. 1 and 2.

In one embodiment, GUI 500 is designed to help users define the file structures of a source dataset through a series of interactive input fields 505. The GUI 500 may include text boxes and/or dropdown menus where users can specify details such as valid file names, formats, and organization of the source dataset. Additionally, there may be buttons to add, remove, or modify these elements as desired.

GUI 500 may also be designed to help users define valid formats, grammar, and format rules for data records and data fields through a series of interactive input fields 510. The GUI 500 may include text boxes and/or dropdown menus where users can specify details such as valid data values or ranges for specific data fields, whether the data fields require a value or is optional, valid grammar, and/or other rules that can be used to validate the source dataset. Additionally, there may be buttons to add, remove, or modify these elements as desired. Upon completing the definitions and rules, a specification configuration 515 is generated for the particular source dataset.

In one embodiment, the GUI 500 operates on a computer equipped with a display 520 for visual interaction and a selection device 525, such as a mouse, to navigate and input data. The GUI 500 may be accessible by remote user devices via network communication to a cloud server that executes the configurable validation system 100 along with the GUI 500.

As disclosed herein, the validation system 100 is configured as a specification neutral design that is configurable by a particular specification configuration. The specification configuration may be defined in advance and/or agreed upon in advance by two vendors involved in the validation (source vendor and destination vendor). The specification configuration is then fed to the validation system 100 to configure its logic and the validation system 100 analyzes the fed source dataset. At the end of the analysis, it generates reports about the source data so the parties can take meaningful actions, for example, to correct corrupt data.

With the present configurable validation system 100, the system and its framework may be designed to support dynamic specification configuration, which provides flexibility for use with any vendor and any type of source data.

When a new specification configuration 105 is input into the analytics module 110 (FIG. 1), the analytics algorithm automatically configures itself with the new data formats and rules for the associated source dataset. Thus, the specification configuration 105 is customizable for a different source dataset to dynamically control the analytics module 110 to scan the different source dataset based on different format rules.

The solution is capable of, but not limited to, functioning in environments with basic infrastructure, including file access, Python installation (v3.0 or later), and the presence of the installed validation system 100 and migration tool solution.

Cloud or Enterprise Embodiments

In one embodiment, the validation system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution.

In one embodiment the validation system 100 is implemented as a centralized server-side application that provides at least the functions disclosed herein and that is accessed by many users via computing devices/terminals communicating with the computing system (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 6:
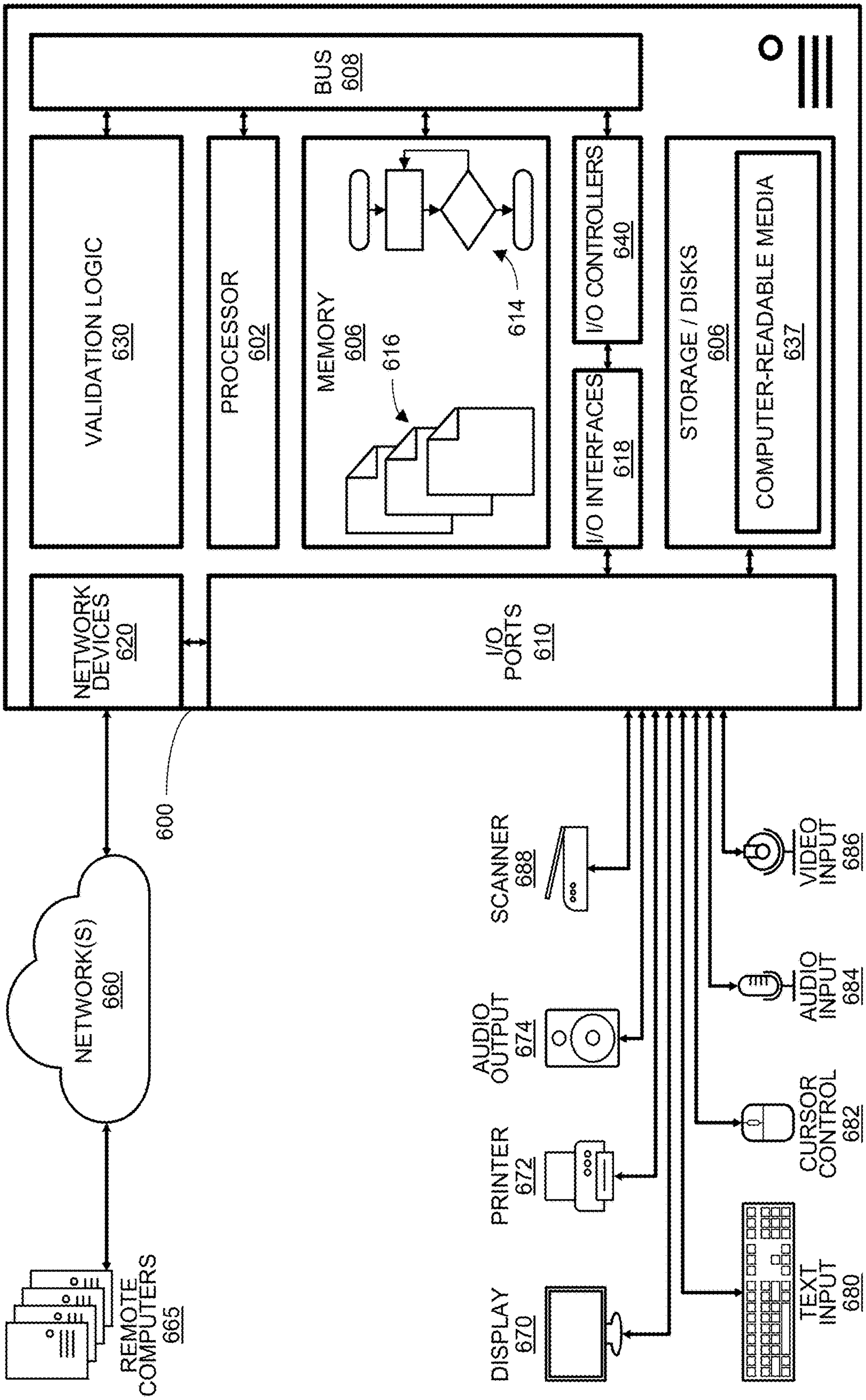
FIG. 6 illustrates an embodiment of a computing system configured with the example systems and/or methods disclosed.

FIG. 6 illustrates an example computing device that is configured and/or programmed as a special purpose computing device with one or more of the example systems and methods described herein, and/or equivalents. The example computing device may be a computer 600 that includes at least one hardware processor 602, a memory 604, and input/output ports 610 operably connected by a bus 608. In one example, the computer 600 may include validation logic 630 configured to facilitate a validation system similar to the configuration validation system 100 shown in FIGS. 1-5.

In different examples, the logic 630 may be implemented in hardware, a non-transitory computer-readable medium 637 with stored instructions, firmware, and/or combinations thereof. While the validation logic 630 is illustrated as a hardware component attached to the bus 608, it is to be appreciated that in other embodiments, the logic 630 could be implemented in the processor 602, stored in memory 604, or stored in disk 606.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to implement the configurable validation system 100. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) for performing one or more of the disclosed functions and/or combinations of the functions.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output (I/O) interface (e.g., card, device) 618 and an input/output port 610 that are controlled by at least an input/output (I/O) controller 640. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with, control, and/or be controlled by input/output (I/O) devices via the input/output (I/O) controller 640, the I/O interfaces 618, and the input/output ports 610. Input/output devices may include, for example, one or more displays 670, printers 672 (such as inkjet, laser, or 3D printers), audio output devices 674 (such as speakers or headphones), text input devices 680 (such as keyboards), cursor control devices 682 for pointing and selection inputs (such as mice, trackballs, touch screens, joysticks, pointing sticks, electronic styluses, electronic pen tablets), audio input devices 684 (such as microphones or external audio players), video input devices 686 (such as video and still cameras, or external video players), image scanners 688, video cards (not shown), disks 606, network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network 660. Through the network, the computer 600 may be logically connected to remote computers 665. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to “one embodiment”, “an embodiment”, “one example”, “an example”, and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase “in one embodiment” does not necessarily refer to the same embodiment, though it may.

A “data structure” or database, as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

“Computer-readable medium” or “computer storage medium”, as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

“Logic”, as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An “operable connection”, or a connection by which entities are “operably connected”, is one in which one or more communication channels are established (or may be established upon a request) that allow signals, data, messages, physical communications, and/or logical communications to be sent and/or received between the entities. An operable connection may include a physical interface, an electrical interface, and/or a data interface with one or more transmitters and receivers that communicate with wired and/or wireless signals. An operable connection may include differing combinations of interfaces and/or connections sufficient to establish and allow communication. For example, two entities can be operably connected to communicate signals to each other directly or through one or more intermediate entities (e.g., processor, operating system, logic, non-transitory computer-readable medium, internet communication devices, local network, etc.). Logical and/or physical communication channels can be used to create an operable connection.

“User”, as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described.

To the extent that the term “includes” or “including” is employed in the detailed description or the claims, it is intended to be inclusive in a manner similar to the term “comprising” as that term is interpreted when employed as a transitional word in a claim.

To the extent that the term “or” is used in the detailed description or claims (e.g., A or B), it is intended to mean “A or B or both”. When intended to indicate “only A or B but not both” then the phrase “only A or B but not both” will be used. Thus, use of the term “or” herein is the inclusive, and not the exclusive use.

What is claimed is:

1. A computing system comprising:

at least one processor operably connected to at least one memory and a non-transitory computer readable medium;

a configurable validation system including instructions stored in the non-transitory computer readable medium that are executable by the at least one processor, wherein the configurable validation system is configured to scan and validate a source dataset, and wherein the configurable validation system is configured to be neutral to expected structures of files and data formats until adapted to the source dataset based on a specification configuration;

wherein the configurable validation system comprises an analytics module configured with scanning variables and validation variables that are configurable by a specification configuration associated with the source dataset;

a graphical user interface configured to display options for selecting the source dataset for validation and for selecting the specification configuration associated with the source dataset;

wherein the configurable validation system is configured to receive the specification configuration associated with the selected source dataset, wherein the specification configuration provides at least scanning parameters and formatting rules that are input to the scanning variables and the validation variables to configure the analytics module to validate the selected source dataset;

wherein the analytics module is configured to scan and validate the selected source dataset at multiple levels based on at least the scanning parameters and the formatting rules from the specification configuration, wherein the multiple levels comprise:

a file level scan based on at least file extensions to identify valid files and identify corrupt files based on whether the files comply with file rules from the specification configuration that define valid file types;

a record level scan that scans and classifies data records in each file into record classifications including valid records, warning records, and error records based on the data records complying with data record rules from the specification configuration; and a field level scan that scans and classifies each data field in the data records for validating each data field into field classifications including valid fields, warning fields, and error fields based on the data field complying with data field rules from the specification configuration; and wherein the configurable validation system is reconfigurable to scan and validate a different source dataset in response to receiving a different specification configuration without reprogramming the configurable validation system.

2. The computing system of claim 1, wherein the graphical user interface is configured to receive a selection of a first source dataset and a first specification configuration associated with the first data source, and wherein the configurable validation system is configured to scan and validate data from the first source dataset based on the first specification configuration; and wherein in response to, via the graphical user interface, a second source dataset being selected having a second specification configuration, the configurable validation system is configured to scan and validate data from the second source dataset based on the second specification configuration without reprogramming the configurable validation system.

3. The computing system of claim 1, wherein the specification configuration of the selected source dataset includes:

a specifications module configured with customizable instructions that define at least a formatting of the selected source dataset that includes at least file structures of files and data structures of data that are expected to be found in the selected source dataset; and a specification rules module configured with customizable rules that define at least data format rules for data records and data fields in the selected source dataset that the data records and data fields are expected to comply with to be valid; and wherein the specifications module and the specification rules module are customizable for a different source dataset to dynamically control the configurable validation system to scan the different source dataset based on different format rules.

4. The computing system of claim 1, wherein the configurable validation system further comprises:

a reporting module configured to generate an insights report from the selected source dataset being scanned and configured to display the insights report on the graphical user interface; and wherein the reporting module is configured to generate the insights report to include:

a file level summary based on the file level scan;

a record level summary based on the record level scan; and a field level summary based on the field level scan; and wherein the insights report is generated to include actionable items to be performed for corrupt data prior to migrating the source dataset to a destination system.

5. The computing system of claim 1, wherein the configurable validation system is further configured to identify how many files from the selected source dataset comply with the formatting rules and how many files do not comply with the formatting rules.

6. The computing system of claim 1, wherein the configurable validation system is further configured to identify how many data records from the selected source dataset comply with the specification configuration and how many data records do not comply with the specification configuration.

7. The computing system of claim 1, wherein the configurable validation system is further configured to:

generate a valid dataset that includes files and data records from the selected source dataset that comply with the specification configuration; and generate a corrupt dataset that includes files and data records from the selected source dataset that do not comply with the specification configuration.

8. The computing system of claim 1, further comprising a second graphical user interface configured to provide options for generating and customizing new specification configurations to create different rules for scanning and validating different source datasets.

9. The computing system of claim 1, further comprising:

a plurality of specification configurations, wherein each specification configuration is assigned to a particular source dataset from a plurality of source datasets and defines scanning rules and validating rules for the particular source dataset; and wherein the configurable validation system is configured to receive as input a selected specification configuration that provides values for the scanning variables and the validation variables of the configurable validation system, wherein the scanning variables and the validation variables configure the configurable validation system to scan and validate an assigned source dataset.

10. A non-transitory computer-readable medium that includes stored thereon computer-executable instructions that implement a configurable validation system that when executed by at least a processor of a computer cause the computer to:

select a source dataset that is identified for migration to a destination system;

generate and configure a specification configuration associated with the source dataset, wherein the specification configuration defines at least (i) expected file formats that identify valid files in the source dataset and (ii) data format rules for identifying expected data record formats and expected data field formats for data records and data fields in the source dataset that the data records and data fields are to comply with to be valid;

retrieve and input, into a configurable validation system, the specification configuration associated with the selected source dataset, wherein the configurable validation system includes scanning variables and validation variables configured to receive, from the specification configuration, values that define expected file formats and expected data record formats for the selected source dataset;

dynamically configure the scanning variables and the validation variables in the configurable validation system for scanning and validating the selected source dataset using the expected file formats and data format rules from the specification configuration;

scan, by the configurable validation system prior to the migration, the selected source dataset based on the dynamically configured scanning variables and the validation variables based on the specification configuration to identify valid files and valid data records that comply with the specification configuration and to identify corrupt files and corrupt data records that do not comply with the specification configuration; and generate, based on the scan, an insights report that identifies at least the corrupt files and the corrupt data records, and generate actionable items to be performed to correct the corrupt files and the corrupt data records prior to migrating the selected source dataset to the destination system.

11. The non-transitory computer-readable medium of claim 10, further comprising instructions that when executed by at least the processor cause the processor to:

generate a valid dataset by storing, in the valid dataset, the valid files and the valid data records from the selected source dataset that comply with the specification configuration; and generate a corrupt dataset by storing the corrupt files and the corrupt data records from the selected source dataset that do not comply with the specification configuration into the corrupt dataset.

12. The non-transitory computer-readable medium of claim 10, wherein the configurable validation system includes an analytics module configured to scan the selected source dataset at multiple levels comprising:

a file level scan based on at least the expected file formats that include file extensions to identify valid files and identify corrupt files based on whether the files comply with the expected file formats from the specification configuration that define valid file types;

a record level scan that scans and classifies data records in each file into record classifications including valid records, warning records, and error records based on the data records complying with the data format rules for identifying the expected data record formats from the specification configuration; and a field level scan that scans and classifies each data field in the data records for validating each data field into field classifications including valid fields, warning fields, and error fields based on the data field complying with data field rules from the specification configuration.

13. The non-transitory computer-readable medium of claim 12, wherein the configurable validation system further comprises:

a reporting module configured to generate an insights report from the scan of the selected source dataset and configured to display the insights report on a graphical user interface;

wherein the reporting module is configured to generate the insights report to include:

a file level summary based on the file level scan;

a record level summary based on the record level scan; and a field level summary based on the field level scan; and wherein the insights report is generated to include actionable items to be performed for corrupt data prior to migrating the source dataset to the destination system.

14. The non-transitory computer-readable medium of claim 10, wherein the specification configuration includes:

a specifications module configured with customizable instructions that define at least a formatting of the selected source dataset that includes at least file structures of files and data structures of data that are expected to be found in the selected source dataset; and a specification rules module configured with customizable instructions that define at least data format rules for data records and data fields in the selected source dataset that the data records and data fields are expected to comply with to be valid.

15. The non-transitory computer-readable medium of claim 10, wherein the specification configuration is customizable for a different source dataset to provide different values for the scanning variables and validation variables, thereby dynamically configuring the configurable validation system to scan and validate the different source dataset based on the different values, without reprogramming the configurable validation system.

16. The non-transitory computer-readable medium of claim 10, further comprising instructions that when executed by at least the processor cause the processor to:

provide a graphical user interface configured to provide options for customizing the specification configuration to create different rules for scanning and validating different source datasets.

17. A computer-implemented method, the method comprising:

selecting, via a graphical user interface, a source dataset;

selecting, via the graphical user interface, a specification configuration that defines at least (i) expected file formats that identify valid files in the source dataset and (ii) data format rules for identifying expected data record formats and expected data field formats for data records and data fields in the source dataset that the data records and data fields are to comply with to be valid;

retrieving and inputting, into a configurable validation system, the specification configuration selected for source dataset, wherein the configurable validation system includes scanning variables and validation variables configured to receive as input, from the specification configuration, values that define expected file formats and expected data record formats for the selected source dataset;

dynamically configuring the scanning variables and the validation variables in the configurable validation system for scanning and validating the source dataset based on the expected file formats and data format rules from the specification configuration;

executing, by at least a processor, the configurable validation system wherein the configurable validation system performs the scanning and validating based on the specification configuration;

scanning and validating, by the configurable validation system, the selected source dataset based on the dynamically configured scanning variables and the validation variables based on the specification configuration;

wherein the scanning and validating includes identifying valid files and valid data records that comply with the specification configuration and identifying invalid files and invalid data records that do not comply with the specification configuration;

generating a valid dataset that includes the valid files and the valid data records from the selected source dataset that are found to comply with the specification configuration during the scanning; and generating an invalid dataset that includes the invalid files and the invalid data records from the selected source dataset that are found not to comply with the specification configuration during the scanning.

18. The method of claim 17, further comprising:

generating and displaying a graphical user interface configured with selectable options and input fields for configuring the specification configuration;

wherein the specification configuration includes:

a first set of customizable instructions that define at least the expected file formats of the source dataset that includes at least file structures of files and data structures of data that are used for scanning the source dataset; and a second set of customizable instructions that define at least the data format rules for data records and data fields in the source dataset that the data records and data fields are expected to comply with to be valid.

19. The method of claim 17, wherein the configurable validation system is data format agnostic and is dynamically changeable to scan a different source dataset by inputting a different specification configuration into the configurable validation system, wherein the different specification configuration provides different values for the scanning variables and the validation variables to control data validation, without reprogramming the configurable validation system.

* * * * *